Feb. 21, 1928.
A. HILFIKER
CALIPER ATTACHMENTS
Filed Feb. 28, 1927
1,659,915
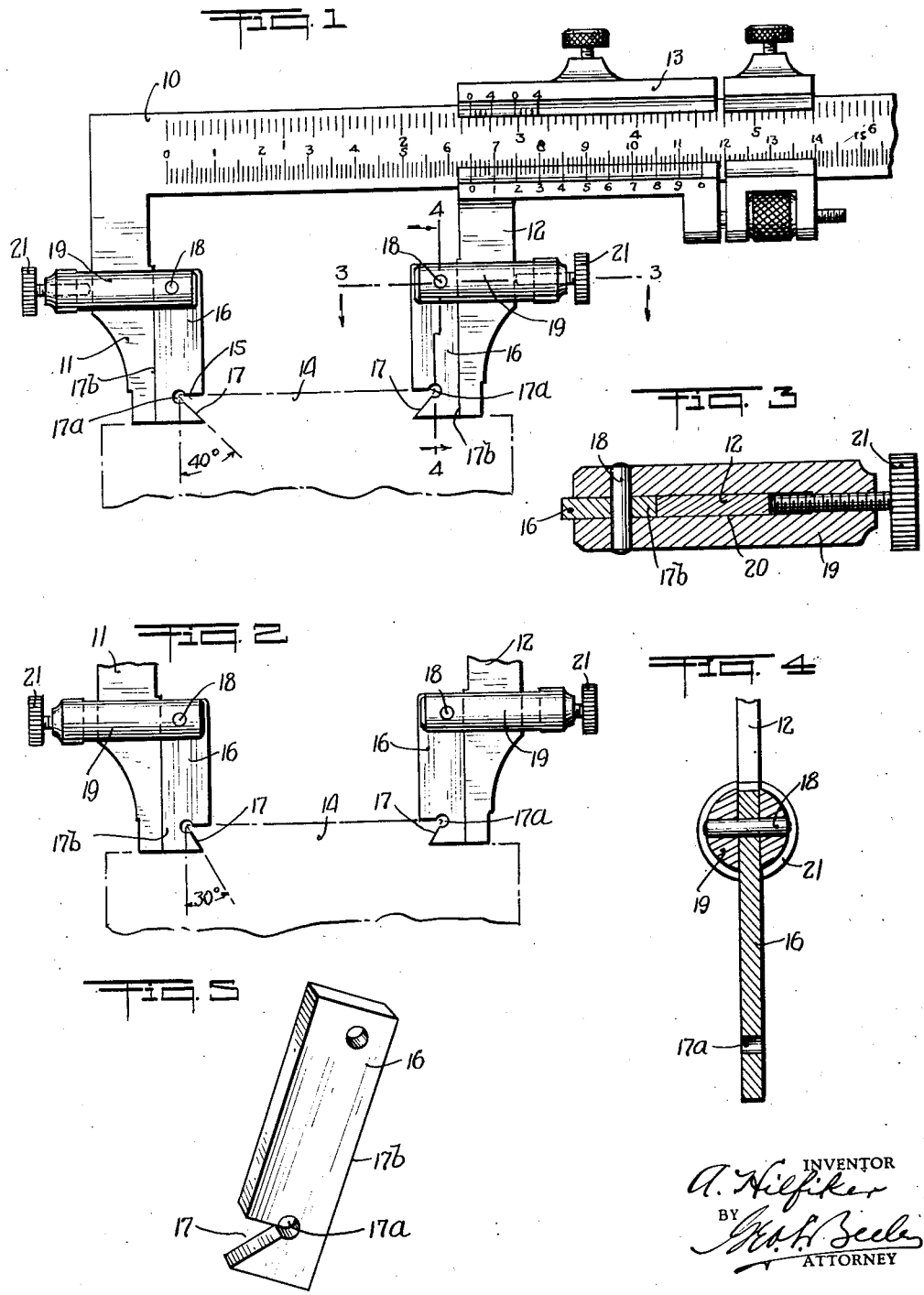

Patented Feb. 21, 1928.

1,659,915

UNITED STATES PATENT OFFICE.

ARNOLD HILFIKER, OF NEW YORK, N. Y.

CALIPER ATTACHMENTS.

Application filed February 28, 1927. Serial No. 171,451.

This invention relates to machine shop instruments and has particular reference to that type of gages known as calipers for measuring spans or distances where the application of a common rule or its equivalent is impossible.

One of the objects of the invention, therefore, is to provide attachment members preferably in pairs for use in connection with a conventional caliper, the attachments being designed to show by direct reading the width of an object, for instance, a slide bar for a lathe or the equivalent.

Whereas the dove tailing of such slide bars is of various angles, and the edges determining the width of the top surfaces are sometimes more or less rounded, it is a difficult matter to determine by direct measuring the practical width of such member, and consequently to reproduce such a bar the mechanic must resort to a considerable amount of cut and try method. With my improvement, however, a standard gage or caliper may be equipped quickly with a pair of attachment members or feet secured by any suitable means to the caliper legs, said feet being formed with dove tail notches of standard angle, the angle selected being in accordance with the dove tailing of the job. Accordingly with the feet attached as indicated, the movable leg of the calper may be adjusted and a direct reading taken.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings in which like reference characters designate the same parts in the several views, and in which—

Figure 1 is a side elevation of a preferred embodiment of the invention in operative position.

Fig. 2 is a similar view showing a different angle for the dove tailing of the job.

Figs. 3 and 4 are sectional detail views on the corresponding lines of Fig. 1.

Fig. 5 is a perspective view of one of the blocks or feet.

Referring now more specifically to the drawings, I show a conventional form of caliper having a blade 10 with different types of scales thereon and having one fixed leg 11 and one adjustable or movable leg 12, the latter being connected to a micrometer slide 13, all of well known construction. In broken lines I indicate what would be understood as a cross section of a dove tail guide bar 14, the angle of the undercut in Fig. 1 being 40°, while that in Fig. 2 is indicated as at 30°. The edges or boundaries 15 of the dove tail member are sometimes quite rounded and consequently their limits are difficult to determine, making it difficult for the practical width of such member to be determined by a common scale.

A machinist given the job of making or reproducing a bar 14 whose angle of undercut is prescribed by the specifications, say 40°, will select a pair of blocks or feet 16 having notches 17 with angles corresponding to the specifications. These feet 16 are connected by any suitable means such as knock-out pins 18 with a pair of clamps 19, each having a central slot 20 to receive a leg 11 or 12. Each clamp also includes a thumb screw 21 co-operating with the outer edge of the caliper leg for securing the foot 16 thereto and with the open notches 17 facing each other. The foot carried by the fixed leg 11 will be applied to the undercut of one side of the bar 14 and the other leg and foot will be brought into place against the other side of the bar by manipulation of the slide 13 in the usual manner.

At the apex of each notch 17 is a rounded seat 17ª, the center of which corresponds precisely to the vertex of the angle of the notch and consequently determines the geometric angle of the side edge of the bar 14. These feet 16 are so constructed as to provide a known interval or space between the center of the seat 17ª and the edge 17ᵇ of the foot that bears against the inner edge of the leg to which the foot is clamped, or more specifically, the spacing between the centers of these seats and the legs 11 and 12 will have a definite relation to the graduation marks on the main plate 10. For example, 0 on the slide 13 will always indicate the span on the adjacent scale marks between the legs 11 and 12, and assuming that the centers of the seats 17ª are each five millimeters from the adjacent leg edge, the machinist will of course understand that the measurement of the bar 14 will be precisely ten millimeters less than the span indicated on the original caliper. Consequently the geometric measurement of the width of the bar 14 will be determined directly and accurately irrespective of the precise form or shape of the edge thereof that projects into either of the notches 17.

In carrying out this invention in a practical embodiment I provide a set of feet including a number of pairs thereof, each pair having a prescribed angle of undercut for the notch 17. If, for example, the job calls for an angle of 35°, the feet 16 will be detached from the clamp 19 by knocking out the pivots or pins 18 and the proper pair will be substituted. These feet are made with absolute precision and inasmuch as they operate in practice directly against the inner edges of the legs of the caliper, the readings are always dependable. The clamps and set screws serve to lock the feet in the position indicated irrespective of any looseness in the joints between the feet and the clamps. Fig. 2 indicates the same arrangement with a changed pair of feet indicating an undercut angle of 30° instead of 40° as shown in Fig. 1.

I claim:

1. A combination with a caliper having a pair of spaced legs adjustable relatively toward and from each other and graduation marks carried by the relatively adjustable parts to indicate the normal space between said legs, of a pair of feet having opposed open angular notches to receive the undercut edges of a member to be measured, the vertices of the angles defined by the notches being a predetermined distance from the edges of the legs with which the feet co-operate, and manually operated means for securing the feet between the legs and in direct contact therewith.

2. In mechanism of the class set forth in claim 1, means to secure the feet to the legs comprising a clamp for each foot having knock-out pin connection therewith, each clamp having a slot to receive therethrough a caliper leg, and a thumb screw carried by the clamp and co-operating with the edge of the leg opposite the foot.

3. The combination with a caliper having two spaced and relatively movable legs, of a set of feet, the feet having oppositely arranged open notches facing each other of a predetermined undercut angle, and clamps for securing the feet to said legs, the clamps having interchangeable engagement with the feet.

4. A construction as set forth in claim 3 characterized by having the vertices of the angles of the notches in the feet disposed at precise distances from the edges of the feet that abut against the adjacent legs.

5. A caliper for measuring the width of a member having a body having angularly disposed sides, said caliper having feet having a fixed inclination to fit the angles of the sides of said member, means detachably engaging said feet to said body, and means coacting with said feet to indicate the distance between the vertices of said angles, the means engaging the feet being clamps that are duplicates of one another, and said feet being duplicates of one another and being interchangeable in the clamps.

In testimony whereof I affix my signature.

ARNOLD HILFIKER.